United States Patent
Lee et al.

(10) Patent No.: US 11,805,459 B2
(45) Date of Patent: Oct. 31, 2023

(54) TECHNIQUES FOR RADIO ACCESS TECHNOLOGY (RAT) FALLBACK IN WIRELESS COMMUNICATIONS

(71) Applicant: QUALCOMM Incorporated, San Diego, CA (US)

(72) Inventors: Kuo-Chun Lee, San Diego, CA (US); Cherng-Shung Hsu, San Diego, CA (US); Arvind Vardarajan Santhanam, San Diego, CA (US); Reza Shahidi, San Diego, CA (US); Bhupesh Manoharlal Umatt, Poway, CA (US); Subashini Krishnamurthy, San Diego, CA (US); Qin Xue Frantti, San Diego, CA (US); Daniel Amerga, San Diego, CA (US); Osama Lotfallah, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/094,500

(22) Filed: Nov. 10, 2020

(65) Prior Publication Data
US 2021/0153087 A1 May 20, 2021

Related U.S. Application Data

(60) Provisional application No. 62/937,617, filed on Nov. 19, 2019.

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0022* (2013.01); *H04W 36/30* (2013.01);
(Continued)

(58) Field of Classification Search
CPC . H04W 36/08; H04W 36/0022; H04W 36/30; H04W 76/27; H04W 76/25;
(Continued)

(56) References Cited

U.S. PATENT DOCUMENTS

| 2010/0113010 A1* | 5/2010 | Tenny | H04W 48/18 455/437 |
| 2010/0279648 A1* | 11/2010 | Song | H04W 36/16 455/404.1 |

(Continued)

OTHER PUBLICATIONS

International Search Report and Written Opinion—PCT/US2020/060016—ISA/EPO—dated Feb. 17, 2021.
(Continued)

*Primary Examiner* — Michael Y Mapa
(74) *Attorney, Agent, or Firm* — Arent Fox LLP (57) ABSTRACT

Some aspects described herein relate to determining to fallback from a first radio access technology (RAT) to a second RAT to perform an emergency call, and deprioritizing, based on the determining to fallback, access to the first RAT to continue to use the second RAT for at least a period of time after the emergency call.

30 Claims, 6 Drawing Sheets

(51) Int. Cl.
*H04W 36/30* (2009.01)
*H04W 76/27* (2018.01)
*H04W 76/25* (2018.01)
*H04W 76/50* (2018.01)

(52) U.S. Cl.
CPC .......... *H04W 76/25* (2018.02); *H04W 76/27* (2018.02); *H04W 76/50* (2018.02)

(58) Field of Classification Search
CPC ....... H04W 76/50; H04W 4/90; H04W 48/18; H04W 48/02
USPC .................... 370/331; 455/404.1, 432.1–453
See application file for complete search history.

(56) References Cited

U.S. PATENT DOCUMENTS

| | | | | |
|---|---|---|---|---|
| 2011/0076982 | A1* | 3/2011 | Li | H04L 65/1016 370/352 |
| 2012/0322447 | A1* | 12/2012 | Ramachandran | H04W 48/18 455/436 |
| 2013/0045707 | A1* | 2/2013 | Lee | H04W 76/50 455/404.1 |
| 2013/0189978 | A1* | 7/2013 | Lee | H04W 48/02 455/434 |
| 2013/0329567 | A1 | 12/2013 | Mathias et al. | |
| 2014/0314046 | A1* | 10/2014 | Jung | H04W 36/165 370/331 |
| 2016/0345234 | A1 | 11/2016 | Yang et al. | |
| 2017/0064598 | A1* | 3/2017 | Jain | H04W 48/18 |
| 2017/0295521 | A1 | 10/2017 | Duan et al. | |
| 2017/0303181 | A1* | 10/2017 | Gupta | H04W 36/0069 |
| 2021/0289412 | A1* | 9/2021 | Zhang | H04W 48/20 |

OTHER PUBLICATIONS

TSG GERAN: "LS on Reselection from GERAN to E-Utran," 3GPP Draft, 3GPP TSG-SA1 #47, S1-093212, 3rd Generation Partnership Project (3GPP), Mobile Competence Centre, 650, Route Des Lucioles, F-06921, Sophia-Antipolis Cedex, France, No. Roma, Aug. 3-7, 2009, Jul. 23, 2009 (Jul. 23, 2009), XP050355532, 2 pages, [retrieved on Jul. 23, 2009] chapter 1.

* cited by examiner

TECHNIQUES FOR RADIO ACCESS TECHNOLOGY (RAT) FALLBACK IN WIRELESS COMMUNICATIONS

CLAIM OF PRIORITY UNDER 35 U.S.C. § 119

The present application for patent claims priority to Provisional Patent Application No. 62/937,617, entitled "TECHNIQUES FOR RADIO ACCESS TECHNOLOGY (RAT) FALLBACK IN WIRELESS COMMUNICATIONS" filed Nov. 19, 2019, which is assigned to the assignee hereof and hereby expressly incorporated by reference herein for all purposes.

BACKGROUND

Aspects of the present disclosure relate generally to wireless communication systems, and more particularly, to fallback between radio access technologies (RATs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, a user equipment (UE) can fallback from 5G to a legacy communication technology, such as long term evolution (LTE), in areas where 5G is not available or otherwise not of sufficient signal power/quality to communicate with the network. In one specific example, a UE can fallback to the legacy communication technology in the case of an emergency call (e.g., a 911 call) to facilitate performing the call on the legacy communication technology, which may have better coverage (e.g., better power and/or quality) than 5G.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining to fallback from a first radio access technology (RAT) to a second RAT to perform an emergency call, and deprioritizing, based on the determining to fallback, access to the first RAT to continue to use the second RAT for at least a period of time after the emergency call.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For instance, in an aspect, an apparatus for wireless communication is provided that includes a transceiver, a memory configured to store instructions, and one or more processors communicatively coupled with the transceiver and the memory. The one or more processors are configured to determine to fallback from a first RAT to a second RAT to perform an emergency call, and deprioritize, based on the determining to fallback, access to the first RAT to continue to use the second RAT for at least a period of time after the emergency call.

In another aspect, an apparatus for wireless communication is provided that includes means for determining to fallback from a first RAT to a second RAT to perform an emergency call, and means for deprioritizing, based on the determining to fallback, access to the first RAT to continue to use the second RAT for at least a period of time after the emergency call.

In another aspect, a computer-readable medium including code executable by one or more processors for wireless communication is provided. The code includes code for determining to fallback from a first RAT to a second RAT to perform an emergency call, and deprioritizing, based on the determining to fallback, access to the first RAT to continue to use the second RAT for at least a period of time after the emergency call.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to fallback from one radio access technology (RAT) to another RAT. For example, a user equipment (UE) operating using a first RAT can fallback to another RAT in various scenarios. In one example, a UE can fallback from a first RAT to another RAT to make an emergency call (e.g., a 911 call). This may occur when signal metrics associated with the first RAT are determined to be below a threshold and/or when signal metrics associated with the fallback RAT are determined to achieve a threshold, etc. For example, the UE can detect a trigger condition for the fallback based on measuring the signal metrics (e.g., signal strength or quality) of signals received using the first RAT and/or based on measuring the signal metrics of signals received using the second RAT. Fallback can generally include reselection from a first RAT corresponding to a first evolved packet system (EPS) to a second RAT corresponding to a second EPS, where the second RAT can be a legacy RAT of the first RAT (and thus referred to as a "fallback"), and where communications with the second RAT may be associated with, or determined to have, better signal power/quality but possibly decreased performance potential. In this example, fallback can also be referred to as EPS fallback.

In a specific example, in fifth generation (5G) new radio (NR) networks (also referred to herein as 5G networks or NR networks), a UE can fallback to a long term evolution (LTE) network to perform an emergency call (also referred to herein as an E911 call). In this example, fallback can include performing cell reselection from the 5G network to the LTE network for the purposes of performing the call. For example, reselection can include handover from a cell of the 5G network to a detected cell of the LTE network. Once the call has ended, however, the UE can typically revert from the fallback network to the 5G network, which may not be desirable where the UE makes another emergency call or loses connection and emergency services attempt to call back.

Accordingly, aspects described herein relate to causing the UE to stay connected to the fallback network for a period of time following completion (or other termination, whether planned or not planned) of the emergency call. This may be beneficial when a UE in 5G standalone (SA) mode only supports EPS fallback for emergency calls, and the emergency call ends at LTE. In this case, the UE can refrain from returning to 5G network immediately after the call, which can mitigate the possibility of having to fallback from 5G through EPS fallback to LTE network again, which can otherwise cause delay of emergency call back. To cause the UE to stay connected to the fallback RAT (e.g., LTE in the above examples), the UE can deprioritize the first RAT (e.g., 5G), from which fallback occurs, for at least a period of time. Deprioritizing the first RAT may include at least one of modifying reselection parameters so the UE prefers connection with the fallback RAT over connection with the first RAT, blocking reselection to networks that use the first RAT, etc., as described further herein. In any case, deprioritizing the first RAT in this regard can allow the UE to stay connected to the fallback RAT for at least a period of time to provide for more efficient emergency call back or reestablishment of a disconnected emergency call, etc.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
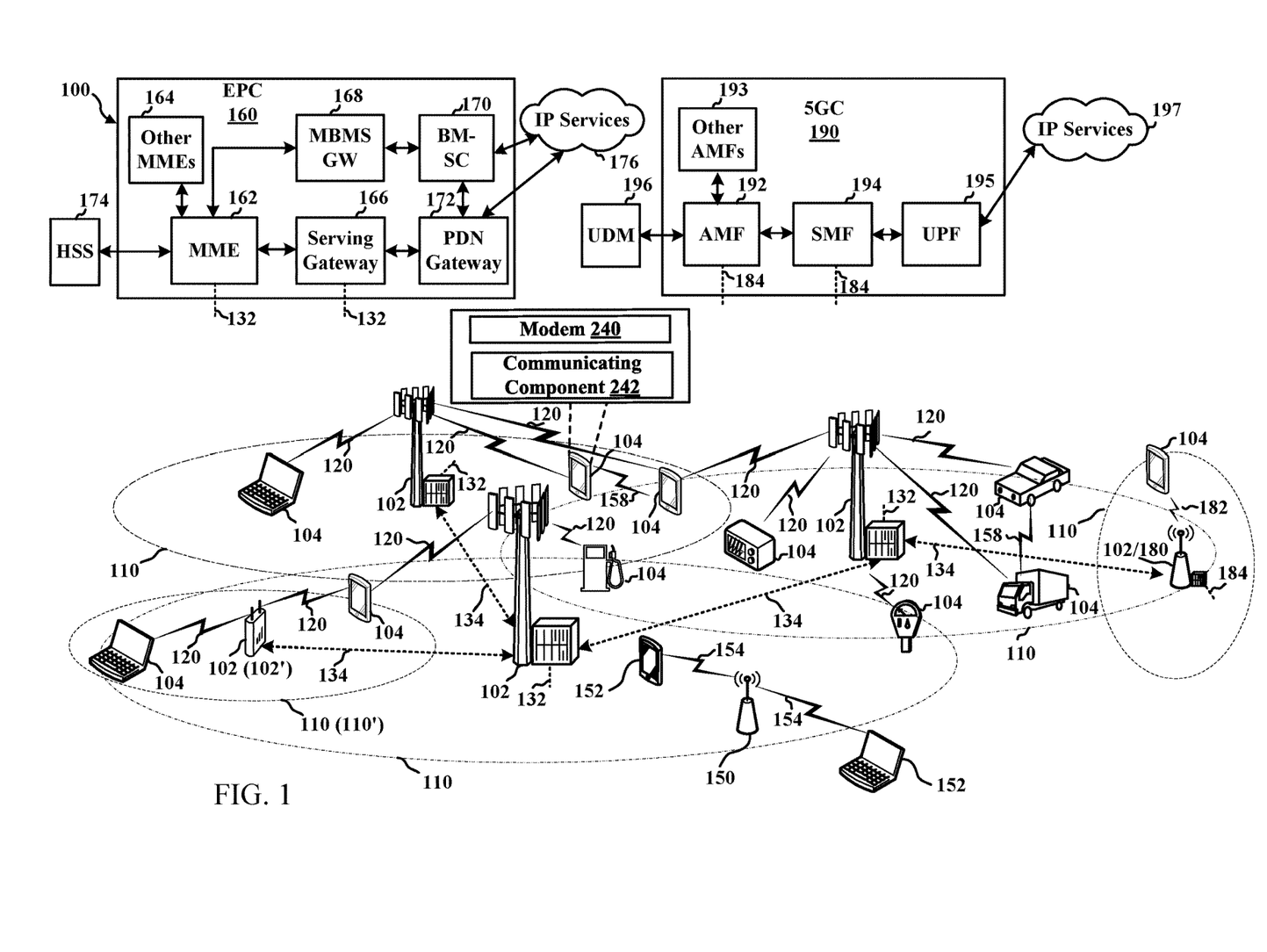
FIG. 1 illustrates an example of a wireless communication system, in accordance with various aspects of the present disclosure.

FIG. 1 is a diagram illustrating an example of a wireless communications system 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for detecting fallback between RATs for an emergency call and continuing on the fallback RAT for at least a period of time after the emergency call. Though a UE 104 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communication (MTC)/enhanced MTC (eMTC, also referred to as category (CAT)-M or Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104 can detect fallback from a first RAT to a second RAT (also referred to herein as a fallback RAT) for the purposes of performing an emergency call and can determine to remain on the second RAT for at least a period of time after the call is completed or otherwise terminated. For example, communicating component 242 can deprioritize the first RAT (e.g., with respect to the fallback RAT or otherwise) to facilitate maintaining the connection with the second RAT for at least the period of time. This can improve user experience with respect to emergency calls by allowing the UE to remain on the fallback RAT for the period of time to potentially receive emergency call back from the emergency service, reestablish an emergency call that was unexpectedly terminated, etc. Following expiration of the period of time, for example, communicating component 242 can reprioritize the first RAT to potentially cause reselection of the first RAT.

Figure 2:
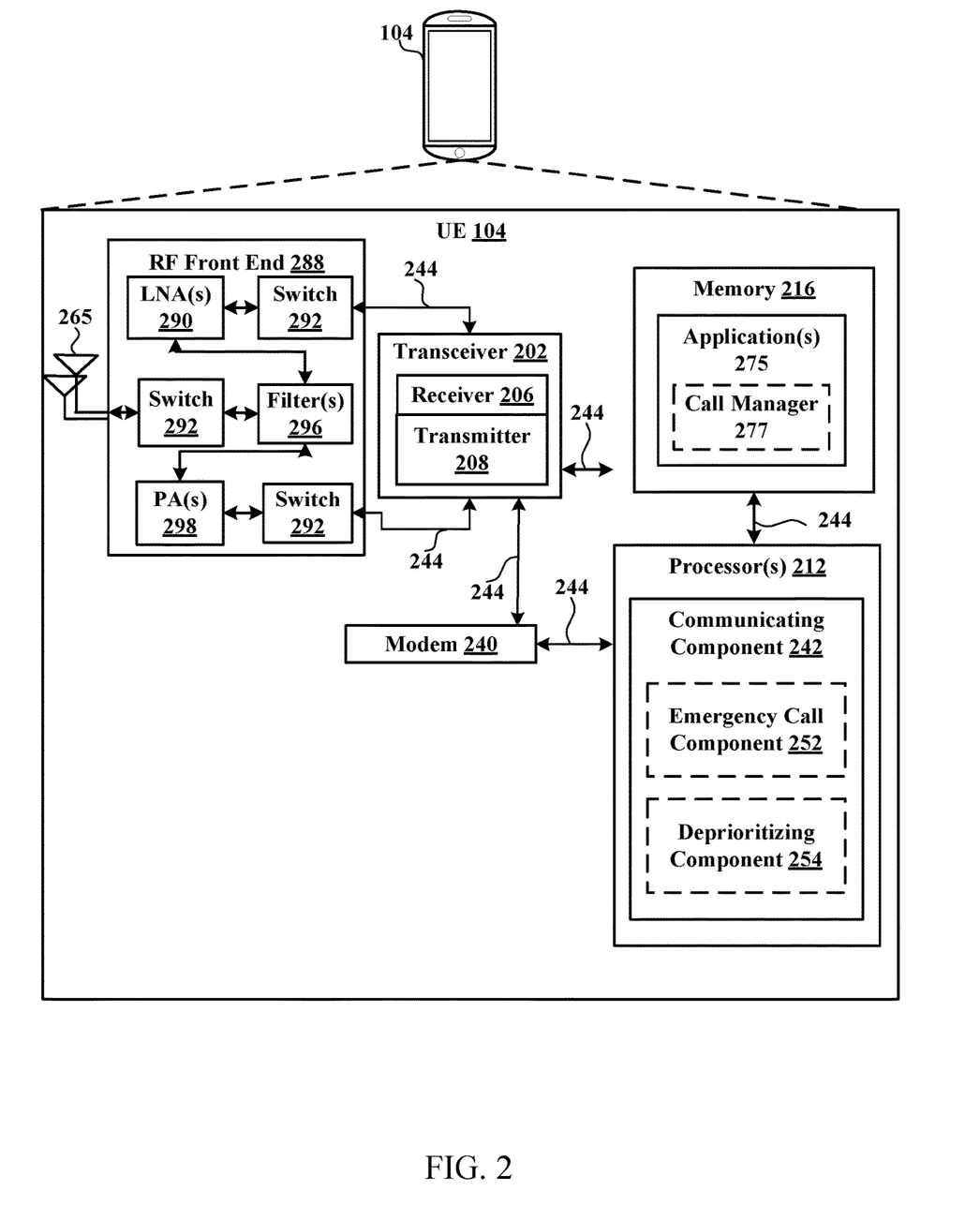
FIG. 2 is a block diagram illustrating an example of a UE, in accordance with various aspects of the present disclosure.
Figure 3:
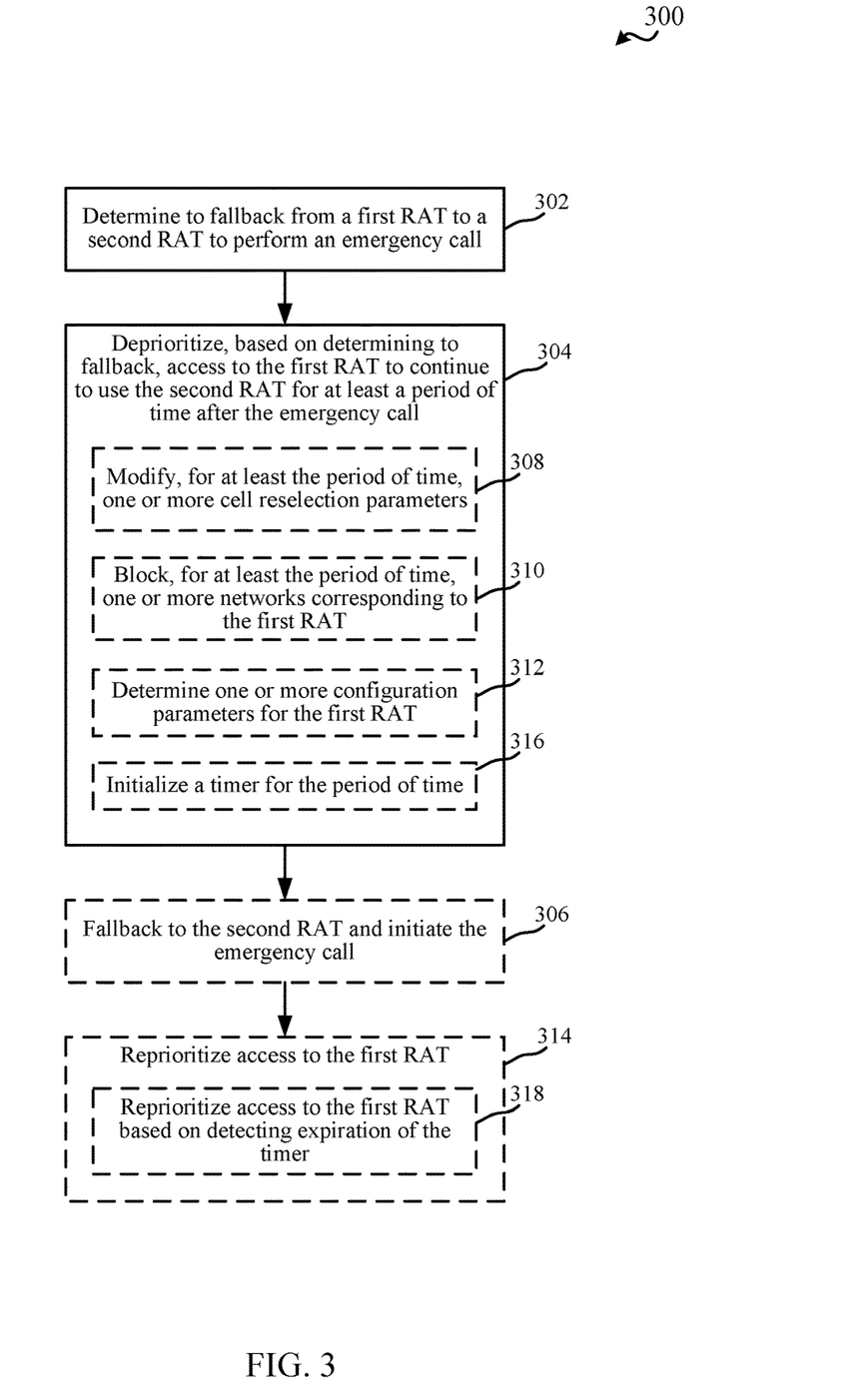
FIG. 3 is a flow chart illustrating an example of a method for determining to deprioritize a radio access technology (RAT) based on an emergency call, in accordance with various aspects of the present disclosure.
Figure 4:
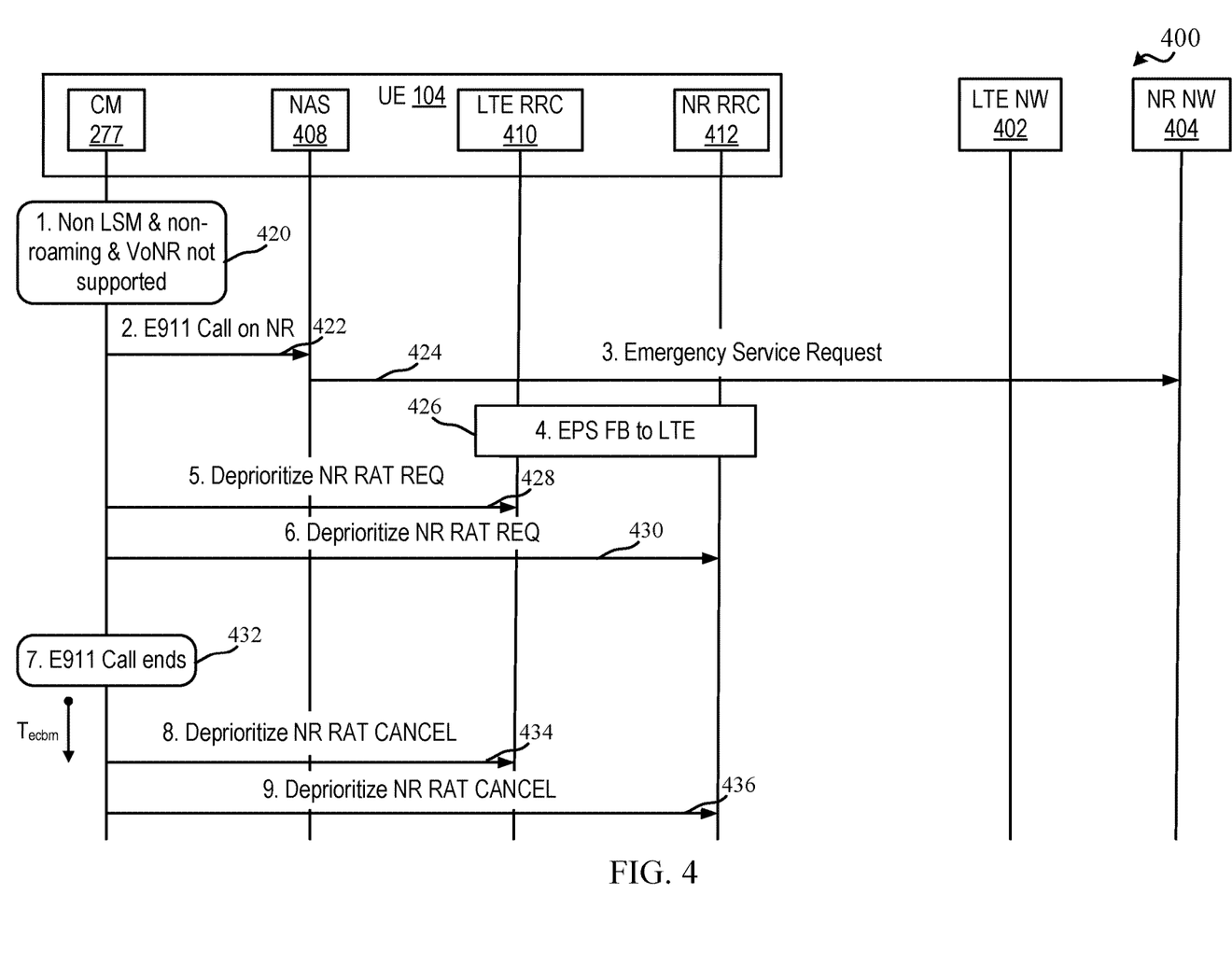
FIG. 4 illustrates an example of a system for deprioritizing a RAT by modifying reselection parameters, in accordance with various aspects of the present disclosure.
Figure 5:
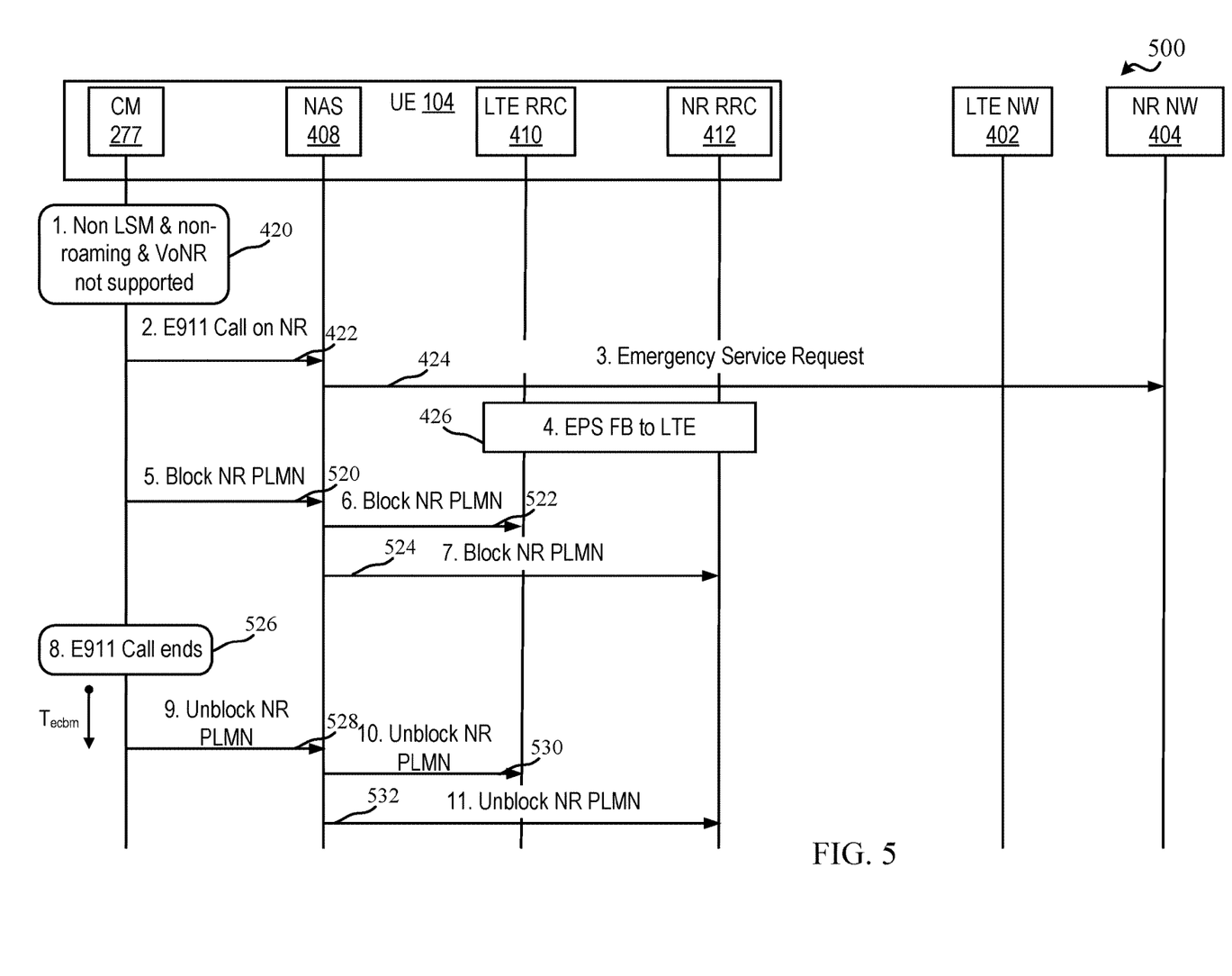
FIG. 5 illustrates an example of a system for deprioritizing a RAT by blocking one or more underlying networks, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 3-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for detecting fallback between RATs for an emergency call and continuing on the fallback RAT for at least a period of time after the emergency call, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. The applications 275 may include a call manager 277 that handles calls for the UE 104, which can include leveraging lower network layers and related components to generate signaling for performing calls by wireless signal transmission/reception with a base station 102. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include an emergency call component 252 for establishing an emergency call, whether initiated at the UE 104, initiated via call back from a base station 102, etc., and a deprioritizing component 254 for deprioritizing a RAT based on establishing, completing, or otherwise terminating an emergency call, as described herein.

In an aspect, the processor(s) 212 may correspond to one or more of the processors described in connection with the UE in FIG. 6. Similarly, the memory 216 may correspond to the memory described in connection with the UE in FIG. 6.

FIG. 3 illustrates a flow chart of an example of a method 300 for deprioritizing a RAT for at least a period of time following, or otherwise based on, an emergency call back. In an example, a UE (e.g., UE 104) can perform the functions described in method 300 using one or more of the components described in FIGS. 1 and 2.

In method 300, at Block 302, it can be determined to fallback from a first RAT to a second RAT to perform an emergency call. In an aspect, emergency call component 252, e.g., in conjunction with processor(s) 212, memory 216, transceiver 202, communicating component 242, call manager 277, etc., can determine to fallback from the first RAT to the second RAT to perform the emergency call. For example, emergency call component 252 can determine to fallback from the first RAT to the second RAT based on detecting initiating of an emergency call via call manager 277 (e.g., detecting dialing of 911 or other emergency number), or based on detecting initiating of other emergency services via UE 104. In addition, for example, emergency call component 252 can determine to fallback based on determining that signal power and/or quality at the first RAT is below a threshold signal power or threshold signal quality, determining that signal power and/or quality at the second RAT (the fallback RAT) achieves a threshold, and/or the like. In another example, emergency call component 252 can determine to fallback to the second RAT based on determining that emergency calls are not supported by the first RAT.

In any case, in this example, emergency call component 252 can cause the UE 104 to fallback from the first RAT to the second RAT for performing the emergency call. For example, emergency call component 252 can reselect, or cause reselection of, a network of the second RAT from a network of the first RAT in performing EPS fallback for performing the emergency call. In a specific example, as described, emergency call component 252 can reselect, or cause reselection of, an LTE network from a 5G network to perform the emergency call over the LTE network. For example, emergency call component 252 can perform reselection to the LTE network where the LTE network has signal power and/or quality that achieves a threshold and/or where the 5G network has a signal power and/or quality that does not achieve a threshold, etc.

In one example, as part of fallback, emergency call component 252 (e.g., via commands from call manager 277) can measure cells of the LTE network for reselection from an ongoing connection with a 5G network. In this example, emergency call component 252 can measure, or cause measurement of, signals received from the cells via lower layers, such as a physical (PHY) layer, media access control (MAC) layer, radio resource control (RRC) layer, etc. In addition, in this example, emergency call component 252 can select, or cause selection of (e.g., via the lower layers), one or more of the cells using non-access stratum (NAS) signaling thereto. In any case, emergency call component 252 can reselect to the network of the fallback RAT to effectuate fallback from the first RAT to the fallback RAT. As described above, the fallback RAT can typically be of a legacy network that may have wider, more adopted coverage, more reliable signaling, etc. such to improve experience, reception, etc. associated with the emergency call.

In method 300, at Block 304, access to the first RAT can be deprioritized, based on determining to fallback, to continue to use the second RAT for at least a period of time after the emergency call. In an aspect, deprioritizing component 254, e.g., in conjunction with processor(s) 212, memory 216, transceiver 202, communicating component 242, call manager 277, etc., can deprioritize, based on determining to fallback, access to the first RAT to continue to use the second RAT for at least a period of time after the emergency call. For example, deprioritizing component 254 can deprioritize reselection to the first RAT to remain on the fallback RAT for at least a period of time to facilitate emergency call back, reestablishment of the emergency call, etc. on the fallback RAT without requiring fallback to again occur from the first RAT to the fallback RAT.

In method 300, optionally at Block 306, the second RAT can be fallen back to and the emergency call can be initiated. In an aspect, emergency call component 252, e.g., in conjunction with processor(s) 212, memory 216, transceiver 202, communicating component 242, call manager 277, etc., can fallback to the second RAT and initiate the emergency call. For example, emergency call component 252 can communicate with a base station using the second RAT to receive resources for accessing a corresponding network. In an example, emergency call component 252 can initiate the emergency call over resources scheduled by the corresponding network for access. In addition, as the first RAT is deprioritized, if the emergency call is terminated (whether by user action to terminate the call or by interference or other environmental concerns that cause the call to be interrupted or terminated), the UE 104 may remain on the second RAT for a period of time to facilitate more efficient reestablishing of the call without having to again fallback from the first RAT.

In an example, in deprioritizing access to the first RAT at Block 304, optionally at Block 308, one or more cell reselection parameters can be modified for at least the period of time. In an aspect, deprioritizing component 254, e.g., in conjunction with processor(s) 212, memory 216, transceiver 202, communicating component 242, call manager 277, etc., can modify, for at least the period of time, the one or more cell reselection parameters. For example, the cell reselection parameters may relate to thresholds for selecting or reselecting to frequencies or cells that use certain RATs, which may be received in a configuration from one or more of the networks (e.g., in a system information block (SIB) received via a base station 102). In one example, the cell reselection parameters may include one or more reselection priorities s for going to LTE from 5G (e.g., for a CellReselectionPriority parameter per each frequency as received in SIB5 defined in 5G NR), one or more reselection priorities for going to 5G from LTE (e.g., for a CellReselectionPriority per each frequency as received in SIB24 defined in LTE), etc. For example, CellReselectionPriority of LTE frequency increases to higher value and CellReselectionPriority of 5G frequency decreases to lower value.

In addition, the one or more parameters may include low and/or high signal power and/or quality thresholds parameters for moving from one RAT to the other RAT. Thus, in a specific example, communicating component 242 can receive in SIB5 (e.g., from a 5G network), and can store in memory 216, a high threshold power threshold parameter (thresX.HighP) and a high threshold quality threshold parameter (thresX.HighQ) for going from NR to one or more frequencies that may be for a LTE RAT. Communicating component 242 can use these parameters for determining when to reselect to an LTE cell based on determining that a reported signal power and/or quality for the LTE cell achieve the thresholds. Similarly, for example, communicating component 242 can receive in SIB24 (e.g., from a LTE network), and can store in memory 216, a low threshold power threshold parameter (thresX.HighP) and a low threshold quality threshold parameter (thresX.HighQ) for going from LTE to one or more frequencies that may be for a NR RAT. Communicating component 242 can use these parameters for determining when to reselect to a 5G cell based on determining that a reported signal power and/or quality for the 5G cell are not below the thresholds.

In this example, deprioritizing component 254 can adjust the thresholds stored in memory 216 to mitigate, for at least the period of time, reselection of a 5G cell from the LTE cell (e.g., during the emergency call and for the period of time after the emergency call). For example, deprioritizing component 254 can decrease thresX.HighP and thresX.HighQ for going to LTE (e.g., decrease to minimum value, such as 0). Deprioritizing component 254 may decrease the thresholds by commanding a 5G RRC layer to decrease the parameter values, as described herein. In addition, for example, deprioritizing component 254 can increase thresX.LowP and thresX.LowQ for going to 5G (e.g., increase to maximum value, such as 31). Deprioritizing component 254 may increase the thresholds by commanding a LTE RRC layer to increase the parameter values, as described herein. In an example, after the period of time, deprioritizing component 254 can set the parameters to original values such that the second RAT (the fallback RAT) is no longer prioritized.

In an example, in deprioritizing access to the first RAT at Block 304, optionally at Block 310, one or more networks corresponding to the first RAT can be blocked for at least the period of time. In an aspect, deprioritizing component 254, e.g., in conjunction with processor(s) 212, memory 216, transceiver 202, communicating component 242, call manager 277, etc., can block, for at least the period of time, the one or more networks corresponding to the first RAT. For example, deprioritizing component 254 can block the one or more networks by commanding a NAS layer to refrain from selecting certain networks (which deprioritizing component 254 determines are NR networks) or from selecting networks of certain types generally, which can be determined by the NAS layer. In another example, deprioritizing component 254 can block the one or more networks by commanding a RRC layer to refrain from measuring certain networks for reselection (which deprioritizing component 254 determines are NR networks) or from measuring networks of certain types generally, which can be determined by the RRC layer. In an example, deprioritizing component 254 can identify the networks based on parameters received from base stations of the network during network discovery, such as a network type or other identifier that can signify a network of the first RAT (e.g., a 5G network).

For example, deprioritizing component 254 can block NR public land mobile networks (PLMNs) so as to avoid selecting NR during and after the emergency call. In this example, the call manager 277 may command NAS to block NR PLMNs (e.g., not select any NR PLMNs). In addition, the call manager 277 can command RRC layer(s) to block NR PLMN (e.g., to refrain from measuring NR RATs in connected mode or idle mode to save power consumption). For example, deprioritizing component 254 may be configured with a list of NR PLMNs, which may be indicated on a subscriber identity module (SIM) or other memory 216 of the UE 104, and may be configured to identify these networks based on parameters received from a base station that provides access to the networks.

In an example, in deprioritizing access to the first RAT at Block 304, optionally at Block 312, one or more configuration parameters for the first RAT can be determined. In an aspect, deprioritizing component 254, e.g., in conjunction with processor(s) 212, memory 216, transceiver 202, communicating component 242, call manager 277, etc., can determine the one or more configuration parameters for the first RAT, and can deprioritize access to the first RAT based further on the one or more configuration parameters. For example, the one or more configuration parameters may be received in a SIB from the first RAT or may relate to status of a connection with the first RAT, whether certain modes or communication types are supported by the first RAT, and/or the like.

In a specific example, the one or more configuration parameters may include whether voice calls are supported in the first RAT (e.g., whether voice-over-NR (VoNR) is supported by both the UE and the network). Deprioritizing component 254 can determine to deprioritize access to the first RAT based on determining that voice calls are not supported in the first RAT (and thus calls must be performed on the fallback RAT). In another example, the one or more configuration parameters may include whether the first RAT network supports emergency services fallback (e.g., EMF=1). Deprioritizing component 254 can determine to deprioritize access to the first RAT based on determining that EMF is supported (and thus emergency calls can use the fallback RAT). In another example, the one or more configuration parameters may include whether the UE 104 is in non-limited service mode (LSM) or non-roaming mode on the first RAT. Deprioritizing component 254 can determine to deprioritize access to the first RAT based on determining that the UE 104 is in non-LSM and/or is non-roaming mode on the first RAT.

In method 300, optionally at Block 314, access to the first RAT can be reprioritized. In an aspect, deprioritizing component 254, e.g., in conjunction with processor(s) 212, memory 216, transceiver 202, communicating component 242, call manager 277, etc., can reprioritize access to the first RAT. For example, deprioritizing component 254 can reprioritize access to the first RAT by reverting changes to the reselection parameters that are modified at Block 308 (e.g., by commanding the RRC layers to set the thresholds to originally configured values). In another example, deprioritizing component 254 can reprioritize access to the first RAT by no longer blocking the one or more networks (e.g., by commanding the NAS to no longer refrain from selecting the one or more networks, by commanding the RRC layers to no longer refrain measuring the one or more networks, etc.).

In one example, in deprioritizing access to the first RAT at Block 304, optionally at Block 316, a timer can be initialized for the period of time. In an aspect, deprioritizing component 254, e.g., in conjunction with processor(s) 212, memory 216, transceiver 202, communicating component 242, call manager 277, etc., can initialize the timer for the period of time. For example, deprioritizing component 254 can initialize the timer after the emergency call is terminated (e.g., purposefully by user interaction, such as pressing an end call button, or by virtue of losing connection, etc.). The timer can be an emergency call back mode (ECBM) timer, after which deprioritization of the first RAT can be cancelled, as described above.

In this example, in reprioritizing access to the first RAT at Block 314, optionally at Block 318, access to the first RAT can be reprioritized based on detecting expiration of the timer. In an aspect, deprioritizing component 254, e.g., in conjunction with processor(s) 212, memory 216, transceiver 202, communicating component 242, call manager 277, etc., can reprioritize access to the first RAT based on detecting expiration of the timer. In this example, once the ECBM timer expires, deprioritizing component 254 can reprioritize the first RAT to allow reselection to the first RAT from the fallback RAT, which may provide improved features, connectivity, efficiency, etc. over the fallback RAT when available (e.g., when associated signal powers/qualities achieve an originally configured threshold for reselecting the first RAT).

FIG. 4 illustrates an example of a system 400 for deprioritizing a RAT by modifying cell reselection parameters. System 400 includes a UE 104 that can communicate with a LTE network (NW) 402 and/or a NR NW 404. UE 104 can include a call manager (CM) 277, a NAS layer 408, a LTE RRC layer 410, and a NR RRC layer 412. CM 277 can determine that the UE is in non-LSM, non-roaming, and VoNR is not supported at 420, as described above. CM 277 can then detect, at 422, a E911 call on NR, and can forward an emergency service request to the NR NW 404 at 424. NR RRC 412 can determine to perform a EPS fallback to LTE at 426. This may occur based on the NR RRC 412 detecting that the call is an emergency call or may occur based on detecting that signals received from NR NW 404 are not of sufficient power or quality, or may occur based on detecting that signals received from LTE NW 402 exceed a certain power or quality, etc. Based on this, CM 277 can determine to deprioritize NR and can send a deprioritize NR RAT request to LTE RRC 410 at 428 to cause LTE RRC 410 to increase NR RAT (or associated frequency) reselection parameter thresholds. CM 277 can also can send a deprioritize NR RAT request to NR RRC 412 at 430 to cause NR RRC 412 to decrease LTE RAT (or associated frequency) reselection parameter thresholds. This can mitigate reselection from LTE to the NR RAT (at least in cases where the LTE RAT is of a sufficient threshold power and/or quality as defined by the updated thresholds).

CM 277 can detect that the E911 call ends at 432 and can initialize a $T_{ecbm}$ timer, as described. After the timer expires, CM 277 can send a deprioritize NR RAT cancel to LTE RRC 410 at 434 to cause LTE RRC 410 to decrease NR RAT reselection parameter thresholds back to configured values. CM 277 can also can send a deprioritize NR RAT cancel to NR RRC 412 at 436 to cause NR RRC 412 to increase LTE RAT reselection parameter thresholds back to configured values. This can facilitate reselection to the NR RAT under intended scenarios, as described, after a sufficient time once the E911 call ends. In addition, in this example, the UE can stay on LTE when the UE or network supports EPS fallback only. In addition, when the LTE signal power and/or quality decreases below a threshold, the UE 104 can move to other legacy technologies (e.g., 3G or 2G), or could possibly move to NR when the modified thresholds cause reselection to NR where LTE degrades beyond an associate level, to receive call back for the emergency call.

FIG. 5 illustrates an example of a system 500 for deprioritizing a RAT by blocking networks. System 500 includes a UE 104 that can communicate with a LTE NW 402 and/or a NR NW 404. UE 104 can include a CM 277, a NAS layer 408, a LTE RRC layer 410, and a NR RRC layer 412, as described. As similarly described in FIG. 4 above, CM 277 can determine that the UE is in non-LSM, non-roaming, and VoNR is not supported at 420, as described above. CM 277 can then detect, at 422, a E911 call on NR, and can forward an emergency service request to the NR NW 404 at 424. NR RRC 412 can determine to perform a EPS fallback to LTE at 426. Based on this, CM 277 can determine to deprioritize NR and can block NR PLMN command to NAS 408 at 520 to cause NAS 408 to not select one or more NR PLMNs. In an example, NAS 408 can send block NR PLMN commands to LTE RRC 410 at 522 and to NR RRC 412 at 524 to cause LTE RRC 410 and/or NR RRC 412 to refrain from measuring cells of NR PLMNs. This can prevent reselection to the NR RAT.

CM 277 can detect that the E911 call ends at 526 and can initialize a $T_{ecbm}$ timer, as described. After the timer expires, CM 277 can send an unblock NR PLMN to the NAS 408 at 528 to cause the NAS 408 to again select NR PLMNs where appropriate. In an example, NAS 408 can send unblock NR PLMN commands to LTE RRC 410 at 530 and to NR RRC 412 at 532 to cause LTE RRC 410 and/or NR RRC 412 to again measure cells of NR PLMNs. This can facilitate reselection to the NR RAT under intended scenarios, as described, after a sufficient time once the E911 call ends. In addition, in this example, the UE can stay on LTE when the UE or network supports EPS fallback only. In addition, when the LTE signal power and/or quality decreases below a threshold, the UE 104 can move to other legacy technologies (e.g., 3G or 2G) to receive call back for the emergency call.

Figure 6:
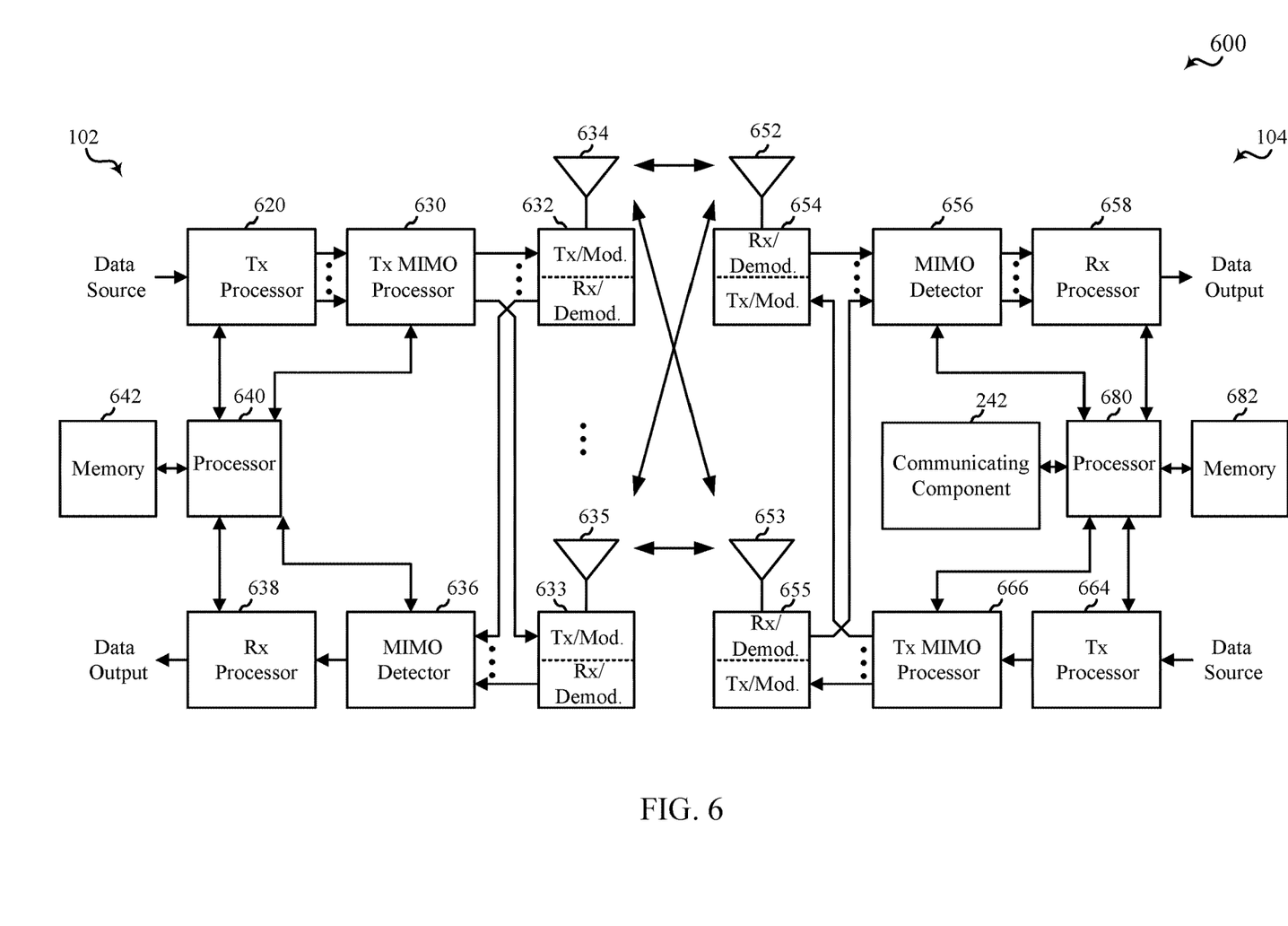
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104, in accordance with various aspects of the present disclosure. The MIMO communication system 600 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including determining to fallback from a first radio access technology (RAT) to a second RAT to perform an emergency call. and deprioritizing, based on the determining to fallback, access to the first RAT to continue to use the second RAT for at least a period of time after the emergency call.

In Aspect 2, the method of Aspect 1 includes wherein deprioritizing access to the first RAT comprises modifying, for at least the period of time, one or more cell reselection parameters corresponding to at least one of the first RAT or the second RAT.

In Aspect 3, the method of Aspect 2 includes wherein modifying the one or more cell reselection parameters includes at least one of decreasing a threshold signal power or quality and increasing reselection priority for determining to select the second RAT in cell reselection.

In Aspect 4, the method of any of Aspects 2 or 3 include wherein modifying the one or more cell reselection parameters includes at least one of increasing a threshold signal power or quality and decreasing reselection priority for determining to select the first RAT in cell reselection.

In Aspect 5, the method of any of Aspects 1 to 4 include wherein deprioritizing access to the first RAT comprises blocking, for at least the period of time, one or more networks corresponding to the first RAT.

In Aspect 6, the method of Aspect 5 includes wherein blocking the one or more networks comprises at least one of commanding a non-access stratum (NAS) layer to refrain from selecting the one or more networks or commanding a radio resource control (RRC) layer to refrain from measuring signals from the one or more networks.

In Aspect 7, the method of any of Aspects 1 to 6 include initializing a timer for at least the period of time, and reprioritizing, based on detecting expiration of the timer, access to the first RAT.

In Aspect 8, the method of any of Aspects 1 to 7 include wherein deprioritizing access to the first RAT is further based at least in part on at least one of determining that voice calls are not supported on the first RAT, determining that only emergency services fallback is supported on the first RAT, determining a non-limited service mode (LSM) for the first RAT, or determining non-roaming mode for the first RAT.

In Aspect 9, the method of any of Aspects 1 to 8 include wherein determining to fallback is based on determining that emergency calls are not supported on the first RAT.

Aspect 10 I an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 9.

Aspect 11 is an apparatus for wireless communication including means for performing the operations of one or more methods in any of Aspects 1 to 9.

Aspect 12 is a computer-readable medium including code executable by one or more processors to perform the operations of one or more methods in any of Aspects 1 to 9.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   performing reselection from a first radio access technology (RAT) to a second RAT to perform an emergency call; and
   deprioritizing, based on and after performing the reselection, access to the first RAT to continue to use the second RAT for at least a period of time corresponding to a timer that is initialized after termination of the emergency call, wherein deprioritizing access to the first RAT comprises modifying, for at least the period of time, cell reselection parameters including:
      a first threshold signal power or quality defined in the first RAT to use in measuring, on a second RAT frequency, cells of the second RAT for reselection from the first RAT to the second RAT, and
      a second threshold signal power or quality defined in the second RAT to use in measuring, on a first RAT frequency, cells of the first RAT for reselection from the second RAT to the first RAT.

2. The method of claim 1, wherein modifying the cell reselection parameters includes decreasing the first threshold signal power or quality.

3. The method of claim 2, wherein modifying the cell reselection parameters includes increasing the second threshold signal power or quality.

4. The method of claim 1, wherein deprioritizing access to the first RAT comprises blocking, for at least the period of time, one or more networks corresponding to the first RAT.

5. The method of claim 4, wherein blocking the one or more networks comprises at least one of commanding a non-access stratum (NAS) layer to refrain from selecting the one or more networks or commanding a radio resource control (RRC) layer to refrain from measuring signals from the one or more networks.

6. The method of claim 1, further comprising:
reprioritizing, based on detecting expiration of the timer, access to the first RAT.

7. The method of claim 1, wherein deprioritizing access to the first RAT is further based at least in part on at least one of determining that voice calls are not supported on the first RAT, determining that only emergency services fallback is supported on the first RAT, determining a non-limited service mode (LSM) for the first RAT, or determining non-roaming mode for the first RAT.

8. The method of claim 1, wherein performing the reselection is based on determining that emergency calls are not supported on the first RAT.

9. An apparatus for wireless communication, comprising:
a transceiver;
a memory configured to store instructions; and
one or more processors coupled with the transceiver and the memory, wherein the one or more processors are configured to:
perform reselection from a first radio access technology (RAT) to a second RAT to perform an emergency call; and
deprioritize, based on and after performing the reselection, access to the first RAT to continue to use the second RAT for at least a period of time corresponding to a timer that is initialized after termination of the emergency call, wherein the one or more processors are configured to deprioritize access to the first RAT at least in part by modifying, for at least the period of time, cell reselection parameters including:
a first threshold signal power or quality defined in the first RAT to use in measuring, on a second RAT frequency, cells of the second RAT for reselection from the first RAT to the second RAT, and
a second threshold signal power or quality defined in the second RAT to use in measuring, on a first RAT frequency, cells of the first RAT for reselection from the second RAT to the first RAT.

10. The apparatus of claim 9, wherein the one or more processors are configured to modify the cell reselection parameters by decreasing the first threshold signal power or quality.

11. The apparatus of claim 10, wherein the one or more processors are configured to modify the cell reselection parameters by increasing the second threshold signal power or quality.

12. The apparatus of claim 9, wherein the one or more processors are configured to deprioritize access to the first RAT at least in part by blocking, for at least the period of time, one or more networks corresponding to the first RAT.

13. The apparatus of claim 12, wherein the one or more processors are configured to block the one or more networks by at least one of commanding a non-access stratum (NAS) layer to refrain from selecting the one or more networks or commanding a radio resource control (RRC) layer to refrain from measuring signals from the one or more networks.

14. The apparatus of claim 9, wherein the one or more processors are further configured to:
reprioritize, based on detecting expiration of the timer, access to the first RAT.

15. The apparatus of claim 9, wherein the one or more processors are configured to deprioritize access to the first RAT further based at least in part on at least one of determining that voice calls are not supported on the first RAT, determining that only emergency services fallback is supported on the first RAT, determining a non-limited service mode (LSM) for the first RAT, or determining non-roaming mode for the first RAT.

16. The apparatus of claim 9, wherein the one or more processors are configured to perform the reselection based on determining that emergency calls are not supported on the first RAT.

17. An apparatus for wireless communication, comprising:
means for performing reselection from a first radio access technology (RAT) to a second RAT to perform an emergency call; and
means for deprioritizing, based on and after performing the reselection, access to the first RAT to continue to use the second RAT for at least a period of time corresponding to a timer that is initialized after termination of the emergency call, wherein the means for deprioritizing access to the first RAT include means for modifying, for at least the period of time, cell reselection parameters including:
a first threshold signal power or quality defined in the first RAT to use in measuring, on a second RAT frequency, cells of the second RAT for reselection from the first RAT to the second RAT, and
a second threshold signal power or quality defined in the second RAT to use in measuring, on a first RAT frequency, cells of the first RAT for reselection from the second RAT to the first RAT.

18. The apparatus of claim 17, wherein the means for deprioritizing modifies the cell reselection parameters by decreasing the first threshold signal power or quality.

19. The apparatus of claim 18, wherein the means for deprioritizing modifies the cell reselection parameters by increasing the second threshold signal power or quality.

20. The apparatus of claim 17, wherein the means for deprioritizing deprioritizes access to the first RAT by blocking, for at least the period of time, one or more networks corresponding to the first RAT.

21. The apparatus of claim 20, wherein the means for deprioritizing blocks the one or more networks by at least one of commanding a non-access stratum (NAS) layer to refrain from selecting the one or more networks or commanding a radio resource control (RRC) layer to refrain from measuring signals from the one or more networks.

22. The apparatus of claim 17, further comprising:
means for reprioritizing, based on detecting expiration of the timer, access to the first RAT.

23. The apparatus of claim 17, wherein the means for deprioritizing deprioritizes access to the first RAT further based at least in part on at least one of determining that voice calls are not supported on the first RAT, determining that only emergency services fallback is supported on the first RAT, determining a non-limited service mode (LSM) for the first RAT, or determining non-roaming mode for the first RAT.

24. A non-transitory computer-readable medium, comprising code executable by one or more processors for wireless communication, the code comprises code for:
performing reselection from a first radio access technology (RAT) to a second RAT to perform an emergency call; and
deprioritizing, based on and after performing the reselection, access to the first RAT to continue to use the second RAT for at least a period of time corresponding to a timer that is initialized after termination of the emergency call, wherein the code for deprioritizing access to the first RAT includes code for modifying, for at least the period of time, cell reselection parameters including:
- a first threshold signal power or quality defined in the first RAT to use in measuring, on a second RAT frequency, cells of the second RAT for reselection from the first RAT to the second RAT, and
- a second threshold signal power or quality defined in the second RAT to use in measuring, on a first RAT frequency, cells of the first RAT for reselection from the second RAT to the first RAT.

25. The non-transitory computer-readable medium of claim 24, wherein the code for deprioritizing modifies the cell reselection parameters by decreasing the first threshold signal power or quality.

26. The non-transitory computer-readable medium of claim 25, wherein the code for deprioritizing modifies the cell reselection parameters by increasing the second threshold signal power or quality.

27. The non-transitory computer-readable medium of claim 24, wherein the code for deprioritizing deprioritizes access to the first RAT by blocking, for at least the period of time, one or more networks corresponding to the first RAT.

28. The non-transitory computer-readable medium of claim 27, wherein the code for deprioritizing blocks the one or more networks by at least one of commanding a non-access stratum (NAS) layer to refrain from selecting the one or more networks or commanding a radio resource control (RRC) layer to refrain from measuring signals from the one or more networks.

29. The non-transitory computer-readable medium of claim 24, further comprising:
- code for reprioritizing, based on detecting expiration of the timer, access to the first RAT.

30. The non-transitory computer-readable medium of claim 24, wherein the code for deprioritizing deprioritizes access to the first RAT further based at least in part on at least one of determining that voice calls are not supported on the first RAT, determining that only emergency services fallback is supported on the first RAT, determining a non-limited service mode (LSM) for the first RAT, or determining non-roaming mode for the first RAT.

* * * * *